Aug. 17, 1937.  M. NEWMARK ET AL  2,090,008
LUBRICATION DEVICE
Filed Jan. 22, 1934  2 Sheets-Sheet 1
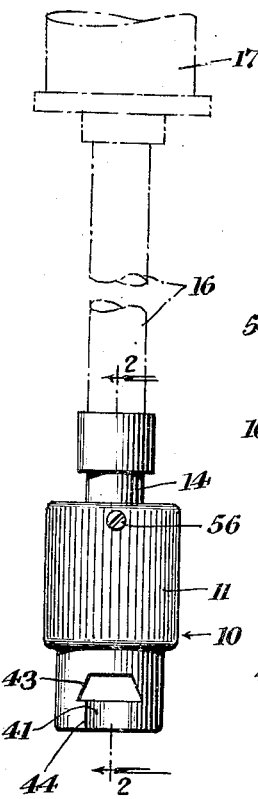
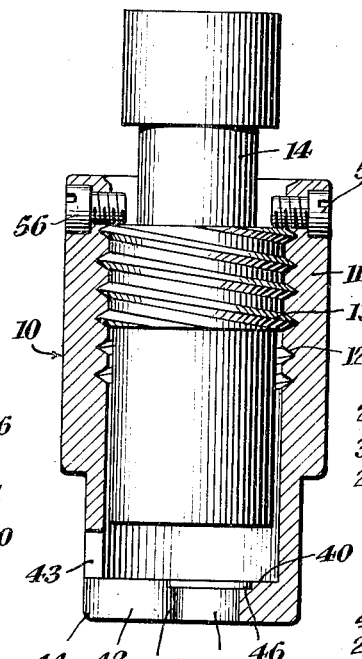
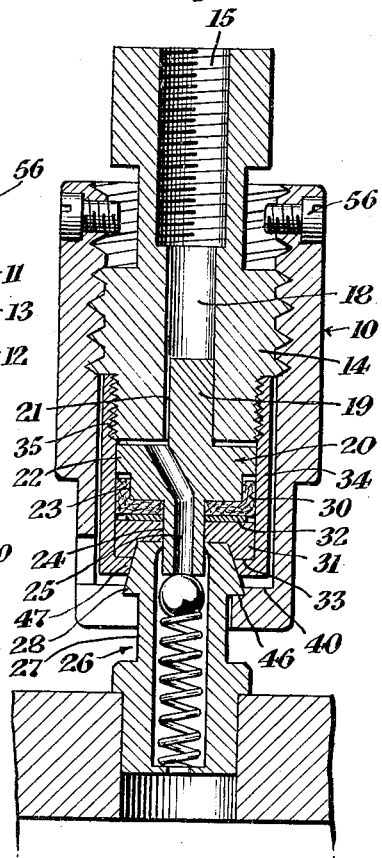
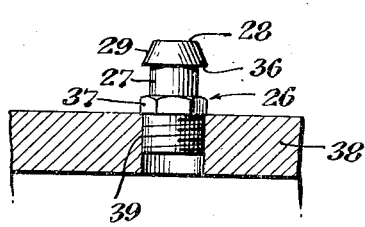
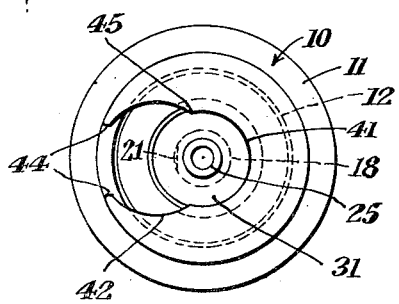
INVENTORS.
Morris Newmark
Elias Mose
Kenyon & Kenyon
ATTORNEYS.

Aug. 17, 1937.  M. NEWMARK ET AL  2,090,008
LUBRICATION DEVICE
Filed Jan. 22, 1934  2 Sheets—Sheet 2

INVENTORS
Morris Newmark
Elias Moss
Kenyon & Kenyon
ATTORNEYS

Patented Aug. 17, 1937

2,090,008

UNITED STATES PATENT OFFICE 2,090,008

LUBRICATION DEVICE

Morris Newmark and Elias Moss, New York, N. Y.

Application January 22, 1934, Serial No. 707,674

6 Claims. (Cl. 285—143)

This invention relates to lubricating apparatus adapted to supply grease under pressure to surfaces requiring lubrication. This invention relates particularly to lubricating apparatus adapted to lubricate a mechanism having a plurality of surfaces to be lubricated which apparatus comprises a plurality of lubricant receiving nipples or fittings communicating with said surfaces and a lubricating nozzle or coupler which is attached to a source of lubricant under pressure and which is adapted to be engaged with and disengaged from the nipples. This application is a continuation in part of our application Serial No. 625,796 filed July 29, 1932 for Lubricating devices which has resulted in Patent No. 1,944,191 dated January 23, 1934.

It is an object of this invention to afford novel and improved means for engaging and disengaging a lubricating nozzle with a lubricant receiving nipple and for clamping and locking these parts together.

It is a feature of this invention that means are afforded permitting introduction of a nipple into a coupling barrel of a lubricating nozzle while the parts are at any one of a variety of different angles with respect to each other. It is a further feature of this invention that the parts not only cooperate with one another to afford coupling by angular and by lateral movement but also act as guiding surfaces which facilitate the movement of the nipple into final coupled position with respect to the coupling barrel.

A feature of one embodiment of this invention is that a coupling barrel is provided having a combined front and side opening with the parts thereof so cooperating that it is immaterial at what angle a nipple is inserted therein within an angular range as high as 90° and over. Moreover, such coupling means is combined with means for holding the barrel against rotation with respect to the nipple both during and after the coupling operation so that the nipple may be moved into coupled relation with respect to the barrel by relative angular and lateral movement of the nipple with respect to the barrel and so that as the nipple moves into coupled relation with the barrel it is held by a portion of the barrel against rotation with respect thereto.

A further feature of this invention lies in the provision of annular nipple head engaging means which serves in combination with the flexibly operable coupling means above mentioned to clamp the head of the nipple between the plunger and coupling barrel of the nozzle in a highly rigid and permanent manner.

Other purposes, features and advantages of this invention will be apparent from the following description of the illustrative embodiments of this invention shown in the accompanying drawings wherein:

Figure 1 is a view in elevation of my improved lubricating device in position ready to be attached to the grease receptacle leading to the surface to be lubricated;

Figure 2 is a view in elevation and partly in section at an enlarged scale taken on line 2—2 of Fig. 1;

Figure 3 is a full sectional view and shows the nozzle coupled to and clamped with the lubricant receiving receptacle;

Figure 4 is a bottom plan view looking towards the end of the barrel;

Figure 5:
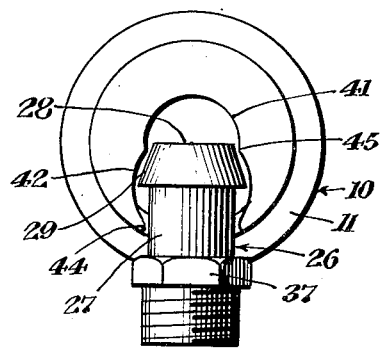
Figure 5 is an end view of the coupling nozzle showing a lubricant receiving nipple inserted therein with its axis at right angles to the axis of the barrel.

Referring now to the embodiment of this invention shown in Figs. 1 to 6 of the drawings, 10 indicates a nozzle comprising a coupler barrel 11 provided with an internal screw thread 12 which is engaged by the screw threaded portion 13 of a plunger 14. The said plunger is provided at its upper end with an internally screw threaded bore 15 or other equivalent means adapted to receive the lower end of a tube 16 leading from a pressure lubricator 17 indicated in dot and dash lines in Fig. 1. Leading from the screw threaded bore 15 is a passageway 18 into which extends a cylindrical stem 19 of a pilot 20, the said stem being flattened as at 21. The said pilot 20 is further provided with upper and lower shoulders 22 and 23 respectively and a teat or projection 24, the said shoulders and teat being provided with a branched opening or passageway 25 in communication with the passageway 18 in the plunger.

A centrally perforated cupped washer preferably made of leather 30 encircles the teat 24 and shoulder 23 and a similar washer 31 separated from the washer 30 by a metal or other hard washer 32 surrounds the teat end 24 and bears against the bottom internal flange 33 of a housing 34 screw threadedly secured to the plunger 14, the said plunger being provided with a reduced screw threaded shoulder 35 for the said purpose.

A pair of screws 56 in the upper portion of the barrel 11 form means to prevent the plunger from being accidentally withdrawn from the said barrel.

It will be seen that the upper washer 30 prevents any leakage of the lubricant passing through the plunger, and the lower washer 31 prevents leakage from the pilot and nipple when the same are joined as described below. The metal washer 32 tends to maintain the washers 30 and 31 fully extended against the interior of the housing 34 and prevents the said washers from adhering together.

The nipple is indicated generally by the reference character 26 and comprises a neck 27 and a head 28 which has a portion thereof of greater diameter than said neck. The head 28 is preferably shaped so as to have a tapering surface 29 tapered toward the lubricant receiving end of the nipple and preferably has a shoulder 36 at the bottom of said tapering surface. The nipple likewise has a polygonal portion 37 such as a hex having preferably opposed parallel surfaces and may be attached to a part to be lubricated 38 by a screw threaded portion 39 or other suitable means.

The lower end of the coupler barrel 11 is provided with novel means for coupling the barrel to the nipple, and for this purpose the end of the barrel is bifurcated so as to afford a shoulder 40 adapted to prevent the axial movement with respect to said barrel of the head 28 of fitting 26 past said shoulder while permitting the neck 27 of said fitting to pass through and be received thereby. The shoulder may be constituted so as to provide an opening 41 which is aligned axially with the axis of the barrel. In combination with such opening is a combined end and side opening for the barrel comprising an end opening portion 42 which is not aligned with the axis of said barrel and which is of sufficient diameter to permit the passing of the head 28 of said nipple 26 therethrough. Also in the side of the barrel is a side opening portion 43 sufficient in size to permit the passing of the head 28 of said nipple therethrough. Between said end opening portion and said side opening portion is a channel 44 which is at least as wide as the diameter of neck 27 of the nipple. Moreover between the end opening portion 42 and opening 41 is a channel 45 which also is at least as wide as the neck 27 of the nipple. Preferably the thickness of the shoulder 40 along the surface 50 is substantially less than the length of neck 27. Moreover, the side opening portion 43 preferably extends down the side of the barrel at least as great a distance beyond the under side of shoulder 40 as the length of the head 28 of nipple 26 and preferably extends down the side of the fitting a slight additional distance.

Figure 6:
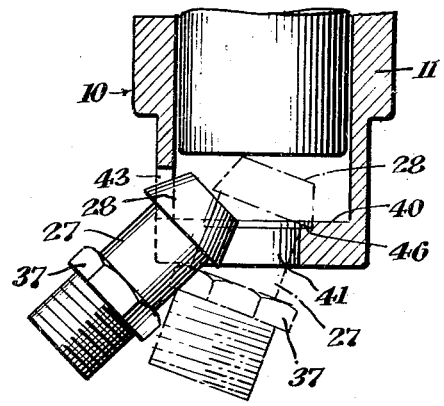
Figure 6 is a side view of the end of the nozzle with the locking barrel in section and shows the lubricant receiving nipple at different angles with respect thereto.

The advantages in operation of the coupling device above described are apparent in connection with Figs. 5 and 6. Not only can the nipple be inserted with the coupling barrel from either the end or side of the barrel while the axes of the nipple and barrel are substantially parallel but also the nipple can be inserted into the barrel while the axis of the nipple is at as much as 90° from the axis of the barrel as shown in Fig. 5. Again the nipple can be inserted in the combined end and side opening while the axis of the nipple is for example, at an angle of 45° with the axis of the coupler as shown in Fig. 6. Having inserted the nipple into the combined end and side opening the nipple by a simple angular and lateral movement can be passed through the position shown in dot and dash lines in Fig. 6 so as to bring head 28 of the fitting 26 underneath the shoulder 40 of the barrel and finally moved into the position which the nipple occupies in Fig. 3. Thus the various openings with channels therebetween as above described cooperate with one another in permitting an angular and lateral engagement of the nipple with the coupling barrel from a wide range of angles of nipple relative to coupling barrel without the necessity of preliminary alignment prior to coupling.

After the head of the nipple has been brought underneath the shoulder 40, the shoulder 36 of the nipple in one embodiment of this invention, may seat in shallow recess 46 about the edge of shoulder 40. After the head of the nipple has been brought underneath the shoulder 40 relative rotation of coupling barrel 11 with respect to plunger 14 causes the end of the head 28 of the nipple to be pressed firmly against washer 31. Moreover, the flange 33 is provided with an annular surface 47 preferably tapered to cooperate with the tapered surface 29 of the head 28 of the nipple. When the end of the head 28 of the fitting is pressed firmly against washer 31, there is preferably only a very slight clearance or no clearance at all between annular surface 47 of flange 33 and the side of the head 28 of the nipple. It is to be understood that the pilot 20 may or may not be pressed all the way back against the end of plunger 14. Thus when the parts are coupled together and the head of the nipple is, for example, clamped between the washer 31 and the shoulder 44, the nipple is held very rigidly and strongly in the lubricating nozzle and resists any attempt to remove the nozzle from the nipple. In bringing the parts into the locked position shown in Fig. 3 the tapered head of the fitting is instrumental as a guiding surface cooperating with annular surface 47 in bringing the nipple into proper position. The surface 47 also aids in locking the nipple in alignment with the nozzle after the head of the nipple has been clamped in the nozzle.

Figure 7:
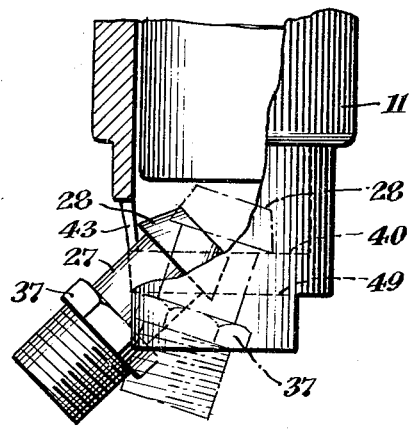
Figure 7 is a side view of the end of a modified form of lubricating nozzle with part thereof cut away showing lubricant receiving nipples at different angles with respect thereto.
Figure 8:
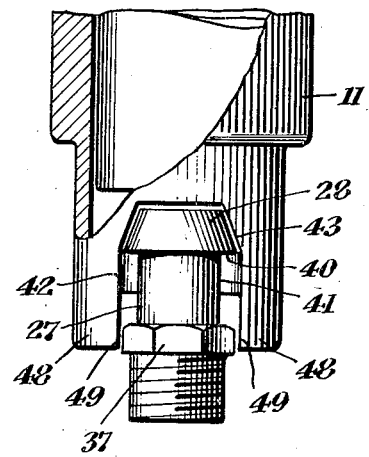
Figure 8 is a front view of the end of the modification shown in Fig. 7 with a nipple coupled therewith.
Figure 9:
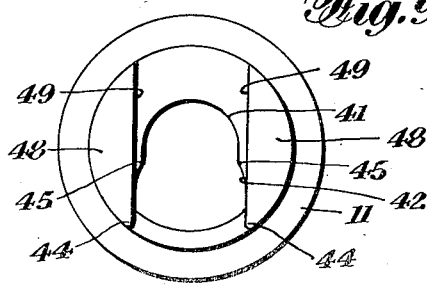
Figure 9 is a bottom plan view of the modification shown in Fig. 7 looking towards the end of the barrel.

A modified form of this invention is shown in Figs. 7, 8 and 9. In this modification the barrel 11 is provided with extensions 48 extending beyond the shoulder 44 having parallel surfaces 49 adapted to cooperate with parallel surfaces of polygonal portions 37 of the nipple. In this modification the distance between the parallel surfaces 49 is preferably at least as great as the diameter of the head of the fitting. In this modification the end opening 42 through shoulder 40, which opening is not in alignment with the axis of the barrel, is carried out to the side of the fitting with a diameter at least as wide as the maximum diameter of the head of the fitting and the channel 44 between the end and side opening portions of the combined end and side opening of the barrel is likewise at least as wide as the maximum diameter of the head 28 of the nipple. Preferably the surfaces 49 are spaced from each other by a distance at least as great as the diameter of end opening 42 of said barrel.

With the apparatus shown in Figs. 7, 8 and 9 the nipple 26 can be introduced from anyone of a plurality of angles into the combined end and side entrance of the barrel. At the same time faces 49 of the barrel come into cooperative relationship with the polygonal portion 37 of the nipple as shown in Fig. 7. The nipple is thus brought to the position shown in Fig. 8 and merely by turning the plunger 14 of the nozzle the head of the nipple can then be clamped in the nozzle. Thus the coupling and clamping operations can be accomplished quickly and easily with one hand from a variety of positions without carefully aligning the parts.

While this invention has been described in connection with certain specific structures, it is to be understood that this has been done merely for the purpose of illustration and that the scope of this invention is not to be limited thereby.

We claim:

1. In lubricating apparatus, the combination with a lubricant receiving nipple having a neck and a head of larger diameter than said neck, of means for coupling a nozzle to said nipple comprising a coupling barrel having a side wall and an end wall, said end wall having an opening therein which is out of alignment with the axis of said barrel and which is at least as wide as said head of said nipple so that said head of said nipple can be passed through said end wall of said barrel, said end wall having an annular shoulder which is of lesser diameter than said opening and communicates with said opening and which is adapted to receive said neck of said nipple in axial alignment with the axis of said barrel and to prevent axial movement of said head of said nipple thereby when said neck of said nipple is in axial alignment with said barrel, said side wall of said barrel having an opening therein which is at least as wide as said head of said nipple and which is disposed in substantially the same radial direction from the axis of said barrel as said opening in said end wall, said end and side walls having channel means therein which communicates between said opening in said end wall and said opening in said side wall and which is at least as wide as the diameter of said neck of said nipple, said opening in said end wall and said opening in said side wall and said channel means between said openings being adapted to afford substantial angular movement of said nipple relative to the axis of said barrel when said head of said nipple is inserted within said barrel.

2. The combination claimed in claim 1 wherein the width of said shoulder is substantially less than the length of the neck of said nipple.

3. The combination claimed in claim 1 wherein the opening in the side wall extends down the side wall from the inner surface of the end wall by a distance at least as great as the length of the head of said nipple.

4. In lubricating apparatus, the combination with a lubricant receiving nipple having a neck between a head of larger diameter than said neck and a polygonal portion spaced from said head, of means for coupling a nozzle to said nipple comprising a coupling barrel having a side wall and an end wall, said end wall having an opening therein which is out of alignment with the axis of said barrel and which is at least as wide as of said head of said nipple so that said head of said nipple can be passed through said end wall of said barrel, said end wall having an annular shoulder which is of lesser diameter than said opening and which communicates with said opening and which is adapted to receive said neck of said nipple in axial alignment with the axis of said barrel and to prevent axial movement of said head of said nipple thereby when said neck of said nipple is in axial alignment with said barrel, said side wall of said barrel having an opening therein which is at least as wide as said head of said nipple and which is disposed in substantially the same radial direction from the axis of said barrel as said opening in said end wall, said end and side walls having channel means therein which communicates between said opening in said end wall and said opening in said side wall and which is at least as wide as the diameter of said neck of said nipple, and projections on said barrel extending beyond said end wall and affording opposed surfaces adapted to coact with said polygonal portion of said nipple when said head of said nipple is inserted in said barrel in axial relation thereto to prevent relative rotation of said nipple and said barrel, said opposed surfaces being spaced apart by a distance at least as great as the diameter of the head of said nipple, and said opening in said end wall and said opening in said side wall and said channel means between said openings and said opposed surfaces being adapted to afford substantial angular movement of said nipple relative to the axis of said barrel when said head of said nipple is inserted within said barrel.

5. The combination claimed in claim 4 wherein said opposed surfaces are adapted to be maintained in cooperative relationship with said polygonal portion of said nipple when said nipple is in a plurality of different angular positions with respect to the axis of said barrel with the head of said nipple within said barrel.

6. The combination claimed in claim 4 wherein said opening in the side wall of said barrel and said opening in said end wall of said barrel and said channel means between said openings are adapted for the insertion of the head of said nipple into said opening in said end wall of said barrel when said nipple is at approximately a 90° angle with respect to the axis of said barrel.

MORRIS NEWMARK.
ELIAS MOSS.